United States Patent
Sanns, Jr.

(10) Patent No.: US 6,326,428 B1
(45) Date of Patent: Dec. 4, 2001

(54) MICA REINFORCED REACTION INJECTION MOLDED POLYURETHANE/POLYUREA

(75) Inventor: Frank Sanns, Jr., Pittsburgh, PA (US)

(73) Assignee: Bayer Corporation, Pittsburgh, PA (US)

(*) Notice: Subject to any disclaimer, the term of this patent is extended or adjusted under 35 U.S.C. 154(b) by 0 days.

(21) Appl. No.: 07/920,219

(22) Filed: Jul. 24, 1992

Related U.S. Application Data

(63) Continuation of application No. 07/371,640, filed on Jun. 26, 1989, now abandoned.

(51) Int. Cl.$^7$ .................. C08K 3/34; C08K 7/00; C08L 75/02; C08L 75/04
(52) U.S. Cl. .................. 524/449; 524/493; 524/789; 524/589; 524/871
(58) Field of Search .................. 523/212; 524/449, 524/492–93, 789, 589–90, 871–75

(56) References Cited

U.S. PATENT DOCUMENTS

| | | | |
|---|---|---|---|
| 4,218,543 | 8/1980 | Weber et al. | 521/51 |
| 4,524,044 | 6/1985 | Nishiyama et al. | 264/328 |
| 4,525,491 | 6/1985 | Narisawa et al. | 521/174 |
| 4,530,941 | 7/1985 | Turner et al. | 521/176 |
| 4,562,215 * | 12/1985 | Carter et al. | |
| 4,564,491 * | 1/1986 | Koestecki | |
| 4,623,986 * | 11/1986 | Umeya et al. | |
| 4,871,789 | 10/1989 | Martinez | 523/220 |
| 4,933,216 * | 6/1990 | Filbert et al. | |

FOREIGN PATENT DOCUMENTS

| | | |
|---|---|---|
| 214533 * | 3/1987 | (EP) . |
| 801070 * | 9/1958 | (GB) . |

OTHER PUBLICATIONS

"Mica as a Reinforcement For Polyurethane RIM" by S. Naik et al May/Jun. 1986—pp. 16–21.
"Development of R–RIM Urethane for Automotive Exterior Parts" by Nishikawa et al—vol. 24, –209—pp. 17–23, 1986.
"Impact Properties of Reinforced RIM Fascia" by Rice et al Mar./Apr. 1983—pp. 114–120.
"Reaction Injection Molding of Mica Reinforced Polyurethane" by Remillard et al, 1986, vol. 7, pp. 395–403.
"High Modulus RIM Elastomers for Automobile Exterior Body Panels" by Metzger—Sep./Oct. 1981—pp. 268–273.
"Reinforced Polyurethanes for Car Body Parts" by Seel et al Kunststoff 71, 1981 (9), pp. 577–584.
Controlling the Physical Properties of RIM Urethanes with Non–Organic Reinforcement by C.J. MacGregor and R.A. Parker—Soc.Automat. Eng. Tech. Pap. Ser. 7 pgs 1979.
Controlling RIM Properties with Reinforcements—CA92–7336(2) Abstract Only.
Suzorite Product Bulletin, Suzorite Mica Products, Inc 3/90.*

* cited by examiner

Primary Examiner—Edward J. Webman
(74) Attorney, Agent, or Firm—Joseph C. Gil; Lyndanne M. Whalen

(57) ABSTRACT

In accordance with the invention, a reinforcing agent is added to the polyol side before the Reaction Injection Molding (RIM) process. The agent of the invention comprise particulate flakes which are characterized by their fine particle size and high aspect ratio. It was surprisingly found that the incorporation of the agent of the invention in the RIM process yields molded parts with a good combination of properties including flexural and tensile modulus heat sag and reduction in the coefficient of linear thermal expansion and high Distinctness Of Image (DOI) values.

3 Claims, No Drawings

MICA REINFORCED REACTION INJECTION MOLDED POLYURETHANE/POLYUREA

This application is a continuation, of application Ser. No. 07/371,640 filed Jun. 26, 1989, now abandoned.

FIELD OF THE INVENTION

The present invention relates to a materials system useful in reaction injection molding and specifically to a reinforcing agent for such materials system.

SUMMARY OF THE INVENTION

In accordance with the invention, a reinforcing agent is added to the polyol side before the Reaction Injection Molding (RIM) process. The agent of the invention comprises particulate flakes which are characterized by their fine particle size and high aspect ratio. It was surprisingly found that the incorporation of the agent of the invention in the RIM process yields molded parts with a good combination of properties including flexural and tensile modulus heat sag and reduction in the coefficient of linear thermal expansion and high Distinctness Of Image (DOI) values.

BACKGROUND OF THE INVENTION

Reaction injection molding (RIM) has become an important process for the production of external automotive body parts and other types of molded products. The process entails the precise metering of two streams of highly reactive liquid components, direct impingement and the intimate mixing of the two streams at high pressure, non-turbulent flow of the mixed components into a closed mold at atmospheric pressure and the completion of the chemical reaction within the mold itself. One of the streams comprises a polyisocyanate component and the second stream includes a isocyanate-reactive component. The polyisocyanate component is typically based on a liquid polyisocyanate. The isocyanate-reactive component contains a high molecular weight component, typically a polyol and/or an amine polyether, and usually also contains a chain extender having amino and/or hydroxyl groups. U.S. Pat. No. 4,218,543 describes a current commercial RIM process.

A modification of the RIM process is the Reinforced Reaction Injection Molding (RRIM) process whereby a reinforcing agent is introduced into the system. Typically, the reinforcing agent comprises glass fibers which impart to the molded article superior mechanical properties. Parts reinforced with glass flakes having a nominal size of about 1/64" offer isotropy and a good profile of mechanical and physical properties. Among the disadvantages associated with these parts is their low DOI values. These values which characterize the surface quality of a painted part may be determined in accordance with a test method known as General Motors Method GM 9101-P which utilizes a lighted "glow box". Alternatively, these values may be determined by an ATI apparatus which is a digital DOI meter.

Spherical particles are not effective in improving the mechanical properties of parts made by RRIM while the use of fiberous or platy fillers contributes to a considerable improvement in the level of the physical properties. Generally, the improved mechanical properties are associated with flake or fiber reinforcement which have an aspect ratio (defined as the ratio between the length of the fiber to its diameter or the ratio of the largest lateral dimension of the flake to its thickness) which is greater than 20. Commonly, glass fibers and flake reinforcement used in the context of RRIM have aspect ratios in the range of 50 to about 150.

The prior art is noted to include the articles "Mica as a Reinforcement For Polyurethane RIM", by Saurabh Naik et al in Plastics Compounding, May/June 1986, pp. 16–21, and in "Development of R-RIM Urethane for Automotive Exterior Parts", by Nishikawa et al, Jap. Plast. Age Vol. 24, Iss 209, pp. 17–23, May-June 1986, both of which disclosed mica as a filler in these applications. In an article entitled "Impact Properties of Reinforced RIM Fascia" by Rice et al (Journal of Cellular plastics March/April 1983, pp. 114), there is disclosed relevant technology. Mica has been mentioned as having a size of 200 mesh. In "Reaction Injection Molding of Mica Reinforced Polyurethane" by Remillard et al in Polymer Composites, October 1986 Vol. 7, No. 5 pp. 395, there is disclosed relevant technology entailing a particular grade of mica. Also relevant is the article entitled "High Modulus RIM Elastomers For Automobile Exterior Body Panels" by Metzger et al in Journal of Cellular Plastics, September/October 1981, pp. 268. In "Variables in reinforced RIM" by McBrayer in Elastomeric, July 1980, there is disclosed mica said to be of a high aspect ratio. In "Reinforced polyurethanes for Car Body Parts" in Kunststoff, (1981) 9, pp. 577–584, Seel et al disclose mica in a relevant material system and conclude that the material characteristics are solely dependent on the concentration of the mica and that they are largely independent of the diameter of the platelets. The diameter of the platelets is said to have an effect on the levels of elongation at break, tensile strength and impact resistance. These are said to be better with platelets having smaller diameters. While mica has been previously mentioned as a filler or as a reinforcing agent in several relevant systems—see for instance U.S. Pat. Nos. 4,525,491, 4,530,941 and 4,524,044—there is no evidence that the mica entailed in the present invention which combines fine particle size and high aspect ratio was used in the past or that its use in the system of the present invention was suggested.

It is an object of the invention to provide a reinforcement for a RIM material system which would yield to the resulting molded part a good combination of mechanical properties and DOI values.

It is a further object of the invention to provide an improvement to the RRIM process which would result in the production of molded parts having desirable properties including both mechanical and esthetic properties.

DETAILED DESCRIPTION OF THE INVENTION

Chemically inert particles having the shape of flakes and characterized in that the largest dimension of their average particle size is smaller than 1/325 inch, preferably smaller than 1/500 inch and in that its aspect ratio is greater than 75, preferably greater than 100, incorporated in a part made by RRIM were found to impart to a RIM-made part a desirable profile of mechanical and physical properties including good DOI values. The flakes useful in the invention need to be substantially chemically inert in the context of the matrix in which they are incorporated and the raw material from which the matrix is prepared. While glass flakes having the size parameters mentioned above are conceptually suitable, mica flakes are currently commercially available. Mica products suitable in the context of the present invention include water ground mica. Suitable products are available under the trade names of Aspraflex, Asprapearl and Aspralok from Huber Corporation. In the context of the invention, the flakes having the desired particle size and aspect ratio may be combined with other, conventional fillers or reinforcing agents such as glass fibers or fillers such as talc or other well known fillers.

In the present context, Distinctness of Image (DOI) is a measure of the sharpness of an image reflected from a part surface. It is usually graded (visually or instrumentally) on a scale of 0–100, in which the human eye can detect differences of around 5 or 10 points. Reinforced RIM parts typically have lower DOI values than do their unreinforced counterparts, painted sheet metal or painted nonreinforced RIM for a variety of reasons. This is believed to be related to the differential shrinkage of the coating during the paint bake cycle, interaction of the paint solvents with the formulation of the substrate, microscopic roughness of the RRIM surface and read-out of imperfections in the mold surface.

The reinforcements in the present context are suitable for use with either flexible or rigid, optionally cellular, polyurethane or polyurea elastomers. The reinforcing agent of the present invention may be used in conjunction with suitable sizing or coupling agents of the types recognized in the art. Further, in the practice of the invention reinforcing agents may be added to the polyol stream at a level which will be sufficient for imparting to the resulting molded part an improved DOI value together with an improved level of stiffness. Care must be taken to make certain that the reinforcing agent of the invention does not render the polyol stream in which it is incorporated, a viscosity greater than about 15000 centipoise at the process temperature (100–150° F.), which viscosity is determined by a Brookfield Helipath RVF Viscometer using a B spindle.

Polyurethane refers to polyaddition products wherein urethane groups and optionally urea groups are formed during the process according to the invention. Polyurea refers to polyaddition products wherein only urea groups are formed during the process according to the invention.

Suitable polyisocyanates for use in the present invention are aliphatic, cycloaliphatic, araliphatic, aromatic and heterocyclic polyisocyanates which are known and described for example by W. Siefken in Justus Liebigs Annalen der Chemie, 562, pages 75–136. Specific examples include ethylene diisocyanate, 1,4-tetra-methylene diisocyanate, 1,6-hexamethylene diisocyanate, 1,12-dodecane diisocyanate, cyclobutane-1,3-diisocyanate, cyclohexane-1,3- and -1,4-diisocyanate and mixtures thereof, 1-isocyanato-3,3,5-trimethyl-5-isocyanatomethyl-cyclohexane (isophorone diisocyanate or IPOI), 2,4- and 2,6-hexahydrotoluylene diisocyanate and mixtures thereof, hexahydro-1,3-and/or -1,4-phenylene diisocyanate, perhydro-2,4'- and/or -4,4'-diphenyl methane diisocyanate, 1,3- and 1,4-phenylene diisocyanate, 2,4- and 2,6-toluylene diisocyanate and mixtures thereof, diphenyl methane 2,4'- and/or 4,4'-diisocyanate, naphthylene 1,5-diisocyanate, triphenyl methane-4,4',4"-triisocyanate and polyphenyl polymethylene polyisocyanates of the type obtained by condensing aniline with formaldehyde, followed by condensation.

It is preferred to use the readily available polyisocyanates such as 2,4- and 2,6-toluene diisocyanate and mixtures of these isomers, polyphenyl polymethylene polyisocyanates of the type obtained by condensing aniline with formaldehyde, followed by phosgenation, and polyisocyanates containing carbodimide groups, urethane groups, allophanate groups, isocyanurate groups, urea groups or biuret groups. Particularly preferred are the liquid derivatives of 4,4'-diphenyl methane diisocyanate (MDI) which may be liquefied inter alia by introducing carbodiimide groups, blending with 2,4'-diphenyl methane diisocyanate or by introducing urethane groups. Especially preferred are the liquefied derivatives of MDI prepared by reacting MDI with 0.1 to 0.3 mols of a polypropylene glycol having a molecular weight of up to about 700, in particular, dipropylene glycol, tripropylene glycol or mixtures thereof as disclosed, for example, in U.S. Pat. No. 3,644,457.

Also suitable for use as the polyisocyanate component are isocyanate-terminated prepolymers based on the above-mentioned polyisocyanates and the isocyanate-reactive compounds, preferably hydroxyl compounds, disclosed hereinafter for use in accordance with the present invention. Prepolymers of this type are disclosed in U.S. Pat. No. 4,374,210. The prepolymers are preferably based on the polyether or polyester polyols disclosed hereinafter and, optionally, the low molecular weight, hydroxyl group-containing chain extenders which are also disclosed hereinafter. Blends of any of the previously disclosed polyisocyanates may also be used in accordance with the present invention.

Other suitable reactants for preparing the products of the present invention include compounds containing at least two isocyanate-reactive groups. These compounds may be divided into two groups, high molecular weight compounds having molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695; and German Patent 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g. reactions between polyisocyanates and amino functional compounds) or polycondensation reactions (e.g. between formaldehyde and phenols and/or amines) are directly carried out in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Suitable aminopolyethers which may be used in accordance with the present invention as high molecular weight compounds (the molecular weight is always the average molecular weight which may be calculated from the functionality with the content of isocyanate-reactive groups) are those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (BE-PS 634,741). U.S. Pat. No. 3,654,370 describes the production of polyoxyalkylene polyamines by reaction of the corresponding polyol with ammonia and hydrogen in the presence of a nickel, copper, chromium catalyst. DE-PS 1,193,671 describes the production of polyethers containing terminal amino groups by hydrogenation of cyanoethylated polyoxypropylene ethers. Other methods for the production of polyoxyalkylene (polyether) amines are described in U.S. Pat. No. 3,155,728, U.S. Pat. No. 3,236,895 and FR-PS 1,551,605. The production of polyethers containing terminal secondary amino groups is described, for example, in FR-PS 1,466,708.

Polyhydroxypolyethers of relatively high molecular weight may be converted into the corresponding anthranilic acid esters by reaction with isatoic acid anhydride, as described, for example, in DE-OS Nos. 2,019,432 and 2,619,840 and in U.S. Pat. Nos. 3,808,250, 3,975,428 and 4,016,143. Polyethers containing terminal aromatic amino groups are formed in this way.

According to DE-OS 2,546,536 and U.S. Pat. No. 3,865,791, relatively high molecular weight compounds containing terminal amino groups are obtained by reaction of NCO prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with DE-OS 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds are used in admixture with up to about 95% by weight, preferably up to about 50% by weight, more preferably about 12 to 26% by weight, based on the total quantity of the high molecular weight compounds, of the low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-2,4-diamino benzene, 1-methyl-3,5-diethyl-2,6-diamino benzene, 1,3-5-trimethyl-2,4-diamino benzene, 1,3,5-triethyl-2,4-diamino benzene, 3,5,3',5'-tetraethyl-4,4'-diamino diphenylmethane, 3,5,3,5'-tetraisopropyl-4,4'-diamino diphenylmethane, 3,5-diethyl-3'-5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and admixtures of the above diamines. Most preferred are mixtures of the above diamines. Most preferred are mixtures of 1-methyl-3,5-diethyl-2,4-diamino benzene and 1-methyl-3,5-diethyl-2,6-diamine benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diamino diphenylmethane, 1,2- and 1,4-phenylene diamine, naphthalene-1,5-diamine and triphenylmethane-4, 4'-4"-triamine. The difunctional and polyfunctional aromatic amine compounds may also exclusively or partly contain secondary amino groups such as 4,4'-di-(methylamino)-diphenylmethane or 1-methyl-2-methylamino-4-benzene. Liquid mixtures of polyphenyl polymethylenepolyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

Other additives which may be used in the present invention include catalysts, especially tin(II) salts of carboxylic aids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the high molecular weight component.

It is also possible to use surface-active additives such as emulsifiers and foam stabilizers. Examples include N-stearyl-N'-N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers and dyes.

The compositions according to the present invention may be molded using conventional processing techniques and are especially suited for processing by the RIM process. In general, two separate streams are intimately mixed and subsequently injected into a suitable mold, although it is possible to use more than two streams. The first stream contains the polyisocyanate component, while the second stream contains the polyol component, chain extenders, the reinforcing agent and any other additive which is to be included.

The invention is further illustrated but is not intended to be limited by the following examples in which all parts and percentages are by weight unless otherwise specified.

EXAMPLES

Molded parts were prepared in accordance with the practice of the invention and their properties determined. In the experiments, a summary of which appears below, mica was compared to glass flakes in terms of the corresponding properties imparted to molded parts. The mica used in these experiments is available from Huber Corporation as water ground mica and the glass flakes are products of Owens Corning Fiberglass Corporation. The material system comprised the following:

34.75 pbw (parts by weight) of an aromatic aminopolyether having a molecular weight of 5500 and a functionality of 3; it is prepared by hydrolyzing a prepolymer formed from toluene diisocyanate and a 4800 molecular weight glycerine/propylene oxide/ethylene oxide polyether (having 17% by weight ethylene oxide termination); the hydrolyzed product has an amine number of 30.3;

34.5 pbw of an aliphatic aminopolyether having a molecular weight of 2500 and a functionality of about 2.5, a product of Texaco Corporation, available as Jeffamine LMT 300;

23 pbw of diethyl toluene diamine having an isomer distribution of about 80% 2.4- and 20% 2,6-;

2 pbw of a fatty ester based on adipic acid, pentaerythritol and oleic acid, having an OH number of 51;

3 pbw of a propylene oxide/ethylene diamine adduct having an OH number of 630;

2 pbw of zinc laurate;

0.75 pbw of a silicone surfactant, L5304 from Union Carbide.

This B component was reacted in a RIM process with an isocyanate (A component) which was a polyether based MDI prepolymer.

The reinforcing agent of the invention and that of the comparison examples was introduced to the polyol stream (B component) at a level which resulted in its presence in the finished part at a level of 20 percent by weight. RIM plaques were prepared using a 2 piston Cinncinati-Milicron RRIM-90 metering unit and press. A rectangular mold of about 900×600×3.5 mm was used to mold the samples under the following conditions:

| Component A Temperature | 54° C. |
|---|---|
| Component B Temperature | 60° C. |
| Isocyanate Index | 105 |
| Mold Temperature | 65° C. |
| Mix Pressure | 2000 psi |
| Demold Time | 30 sec. |

The table below summarizes the results of the evaluation.

| Flake Material | | Glass | | Mica |
|---|---|---|---|---|
| Flakes size (inch, max.) | 1/57 | 1/64 | 1/83 | 1/500 |
| Aspect ratio (estimate) | 120 | 100 | 75 | 120 |
| Flexural Modulus (Kpsi) | 220 | 200 | 170 | 220 |
| Coefficient of Linear Thermal Expansion (×10$^{-6}$/° F.) | 30 | 32 | 39 | 30 |
| DOI | 55 | 60 | 65 | 90 |

The results clearly demonstrate that the reinforcing agent of the invention imparts to the molded part a superior DOI value along with excellent stiffness, as measured by its flexural modulus, and a minimal linear expansion. In comparison to glass flakes of a substantially similar aspect ratio, the reinforcing agent of the invention which has considerably finer particles, has considerably greater DOI values.

A Uniprime steel which has a DOI value—determined visually—of 88, on the average, may be used as a standard for comparison. In all cases the molded part was painted and baked in accordance with industry standards and the DOI values were determined visually.

The invention has been described in detail above and the objects set forth above are efficiently attained. Certain changes may be made in carrying out the above process and the improvement set forth without departing from the scope of this invention; it is intended that all matters contained in the above description shall be interpreted as illustrative and not in a limiting sense.

What is claimed is:

1. A filled polymer composition comprising a polyurethane and/or polyurea matrix having dispersed therein a mica filler having a thickness of less than 1.04 micrometers and an aspect ratio of greater than 75.

2. A filled polymer composition comprising a polyurethane and/or polyurea matrix having dispersed therein a mica filler having a thickness of 0.42 micrometers and an aspect ratio of 120, the surface of the composition exhibiting a distinctness of image when painted that is within 2 DOI units of the distinctness of image of similarly painted steel.

3. The filled polymer composition of claim 2 wherein said mica amounts to 20% by weight of said composition.

* * * * *